(12) United States Patent
Kurokawa et al.

(10) Patent No.: US 8,620,378 B2
(45) Date of Patent: Dec. 31, 2013

(54) COMMUNICATION SYSTEM, FEMTO ACCESS POINT AND COMMUNICATION METHOD

(75) Inventors: Osamu Kurokawa, Tokyo (JP); Kazuki Eguchi, Tokyo (JP); Naoki Yoshida, Tokyo (JP); Shunsuke Yokouchi, Tokyo (JP); Yasuhiro Watanabe, Tokyo (JP); Hiroaki Akiyama, Tokyo (JP); Takuo Akimoto, Tokyo (JP)

(73) Assignee: Nec Corporation, Tokyo (JP)

( * ) Notice: Subject to any disclaimer, the term of this patent is extended or adjusted under 35 U.S.C. 154(b) by 229 days.

(21) Appl. No.: 13/133,720

(22) PCT Filed: Dec. 21, 2009

(86) PCT No.: PCT/JP2009/071251
§ 371 (c)(1),
(2), (4) Date: Jul. 21, 2011

(87) PCT Pub. No.: WO2010/074035
PCT Pub. Date: Jul. 1, 2010

(65) Prior Publication Data
US 2011/0269483 A1 Nov. 3, 2011

(30) Foreign Application Priority Data
Dec. 26, 2008 (JP) .................................. 2008-333653

(51) Int. Cl.
*H04M 1/00* (2006.01)
(52) U.S. Cl.
USPC ................ 455/552.1; 455/561; 455/456.1; 370/338; 370/335
(58) Field of Classification Search
USPC ............. 455/552.1, 561, 456.1; 370/338, 335
See application file for complete search history.

(56) References Cited

U.S. PATENT DOCUMENTS

| 7,822,004 | B2 * | 10/2010 | Hashimoto et al. | 370/338 |
| 2007/0121827 | A1 | 5/2007 | Urayama et al. | |
| 2008/0316976 | A1 * | 12/2008 | Thompson et al. | 370/335 |

FOREIGN PATENT DOCUMENTS

| CN | 101049036 A | 10/2007 |
| JP | 5-199171 A | 8/1993 |
| JP | 10-313485 A | 11/1998 |
| JP | 11-331921 A | 11/1999 |
| JP | 2005045685 A | 2/2005 |
| JP | 2007074424 A | 3/2007 |
| JP | 2008-283648 A | 11/2008 |
| JP | 2009-510971 A | 3/2009 |
| JP | 2010-532937 A | 10/2010 |
| WO | 2007/040451 A1 | 4/2007 |
| WO | 2008/147262 A1 | 12/2008 |

OTHER PUBLICATIONS

International Search Report for PCT/JP2009/071251 mailed Feb. 23, 2010.
Chinese Office Action for CN Application No. 200980152953.7 issued on Jan. 31, 2013 with English Translation.
Japanese Office Action for JP Application No. 2008-333653 mailed on Jul. 16, 2013 with Partial English Translation.
The Extended European Search Report for EP 09834836.0 dated on Apr. 3, 2013.

* cited by examiner

*Primary Examiner* — Ajit Patel
*Assistant Examiner* — Julio Perez (57) ABSTRACT

A Femto Access Point includes determination means for determining whether or not called side user equipment is accommodated in the Femto Access Point; and communication control means for, if the determination means has determined that the called side user equipment is accommodated in the Femto Access Point, sending out a Ring Back Tone to calling side user equipment.

17 Claims, 6 Drawing Sheets

COMMUNICATION SYSTEM, FEMTO ACCESS POINT AND COMMUNICATION METHOD

This application is the National Phase of PCT/JP20091071251 filed Dec. 21, 2009, which is based upon and claims the benefit of priority from Japanese patent application No. 2008-333653, filed on Dec. 26, 2008, the disclosure of which is incorporated herein in its entirety by reference.

TECHNICAL FIELD

The present invention relates to a communication system including a Femto Access Point, the Femto Access Point and a communication method therefor.

BACKGROUND ART

When a call is made from a fixed telephone, user equipment (UE) or the like, a sound, which is transmitted to the fixed telephone or the UE of a caller, when the caller has made a call to a preferred destination and receives a telephone can, is referred to as a "Ring Back Tone".

In a 3G (third generation: third generation mobile communication) network which is an existing public mobile communication network and in which an incoming call from the UE such as a cellular telephone is enabled, a Ring Back Tone unique to each system operator of a telecommunications carrier or the like (SRBT: Special-RBT) is used.

In such an existing 3G network, an MSC (Mobile Switching Center) which is a switching center includes a sound source of the SRBT, and the SRBT is provided from the above described MSC to the UE of the caller.

Figure 1:
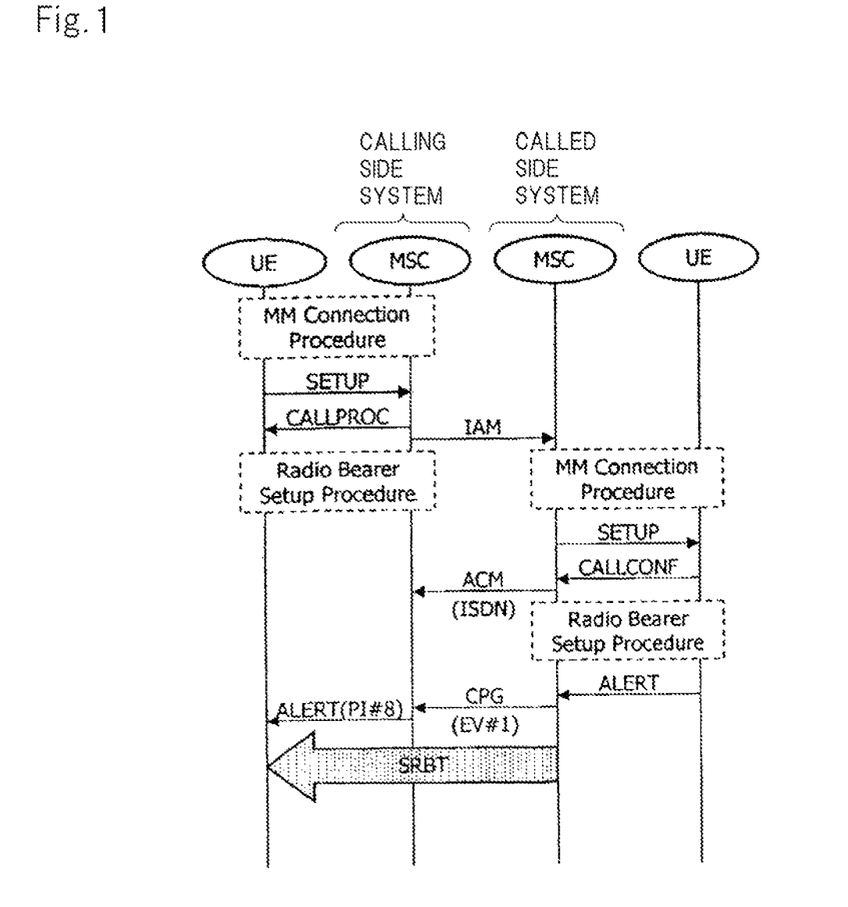
FIG. 1 is a sequence diagram showing an SRBT sending procedure in an existing 3G network.

FIG. 1 shows a processing procedure in which the UE makes the call and in which the SRBT is transmitted to the above described UE in the existing 3G network.

When arbitrary UE makes the call, an MSC of a communication system (hereinafter referred to as "calling side system") which accommodates the above described UE (hereinafter referred to as "calling UE") executes an MM Connection Procedure including an authentication process for the calling UE, and a Radio Bearer Setup Procedure such as setting a band used for radio communication with the calling UE.

When the MM Connection Procedure with the calling UE is completed, the MSC of the calling side system transmits an IAM message for requesting that a call be connected to an MSC of a communication system (hereinafter referred to as "called side system") which accommodates UE (hereinafter referred to as "called UE") of the call destination.

When the MSC of the called side system receives the IAM message, the MSC of the called side system executes the MM Connection Procedure including the authentication process for the call may be incoming in UE1, which is the transfer destination of call, and the Radio Bearer Setup Procedure such as setting of a band used for radio communication with the call may be incoming in UE1, which is the transfer destination of call, similarly to the calling side system.

When the Radio Bearer Setup Procedure is completed and preparations are made to connect the incoming call, the UE that received the call calls the user, and also transmits an ALERT signal, indicating a start of calling the above described user, to the MSC of the called side system.

When the MSC of the called side system receives the ALERT signal from the called UE, the MSC of the called side system transmits a call progress message (CPG), indicating an occurrence of an event (the user is being called) concerning which the calling side is to be notified, to the MSC of the calling side system.

When the MSC of the calling side system receives the above described call progress message, the MSC of the calling side system transmits the ALERT signal, indicating the start of calling a called side user, to the calling UE. Subsequently, the MSC of the called side system uses the sound source included in the device itself to transmit the SRBT to the calling UE.

Note that a configuration for outputting the SRBT to an IP telephone connected to a fixed network is described, for example, in Patent Document 1. Patent Document 1 describes a technique in which, when a transmission request is received by a call connection controller from a calling side PC, the Ring Back Tone is sent out to the IP telephone in cooperation with the above described calling side PC.

Incidentally, in recent years, a femto cell in which a wired line installed at home, an office or the like is used to connect the UE to a mobile communication core network, has drawn attention.

The femto cell is a radio communication scheme which is assumed to be mainly for indoor radio communication at home, the office or the like, and uses a Femto AP covering a small communication area with a radius in the order of several tens of meters to enable radio communication with the UE. Thereby, various communication services can be provided to the user using the UE, without requiring a maintenance cost for a radio base station, a Radio Network Controller, the MSC and the like which support an existing macro cell.

However, like the existing 3G network shown in FIG. 1 and a system configuration described in the above described Patent Document 1, the communication system including the Femto AP of the related art is not configured assuming that the SRBT is transmitted to the calling UE accommodated in the Femto AP.

CITATION LIST

Patent Document

[Patent Document 1] Japanese Patent Laid-Open No. 2007-74424

SUMMARY

Accordingly, an object of the present invention is to provide a communication system, a Femto Access Point and a communication method in which a Ring Back Tone unique to the system can be transmitted to calling UE in the communication system including the Femto Access Point, similarly to an existing public mobile communication network.

In order to achieve the above described object, the exemplary aspect of the communication system of the present invention is a communication system including a Femto Access Point which can accommodate user equipment by means of radio communication, wherein the above described Femto Access Point includes:
determination means for determining whether or not called side user equipment is accommodated in the Femto Access Point; and
communication control means for, if the above described determination means has determined that the above described called side user equipment is accommodated in the Femto Access Point, sending out a Ring Back Tone to calling side user equipment.

The Femto Access Point of the present invention is a Femto Access Point which can accommodate user equipment by means of radio communication, including:

determination means for determining whether or not called side user equipment is accommodated in the Femto Access Point; and communication control means for, if the above described determination means has determined that the above described called side user equipment is accommodated in the Femto Access Point, sending out a Ring Back Tone to calling side user equipment.

Moreover, the communication method of the present invention is a communication method in a communication system including a Femto Access Point which can accommodate user equipment by means of radio communication, wherein the above described Femto Access Point determines whether or not called side user equipment is accommodated in the Femto Access Point, and if the above described Femto Access Point has determined that the above described called side user equipment is accommodated in the Femto Access Point, the above described Femto Access Point sends out a Ring Back Tone to calling side user equipment.

EXEMPLARY EMBODIMENT

Next, the present invention will be described by using the drawings.

In an exemplary embodiment, a communication system is proposed in which a unique SRBT which has been set by a telecommunications carrier or the like can be provided to UE which makes a call via a Femto Access Point (Femto AP), similarly to an existing 3G network that complies with standards such as 3GPP (3rd Generation Partnership Project).

Figure 2:
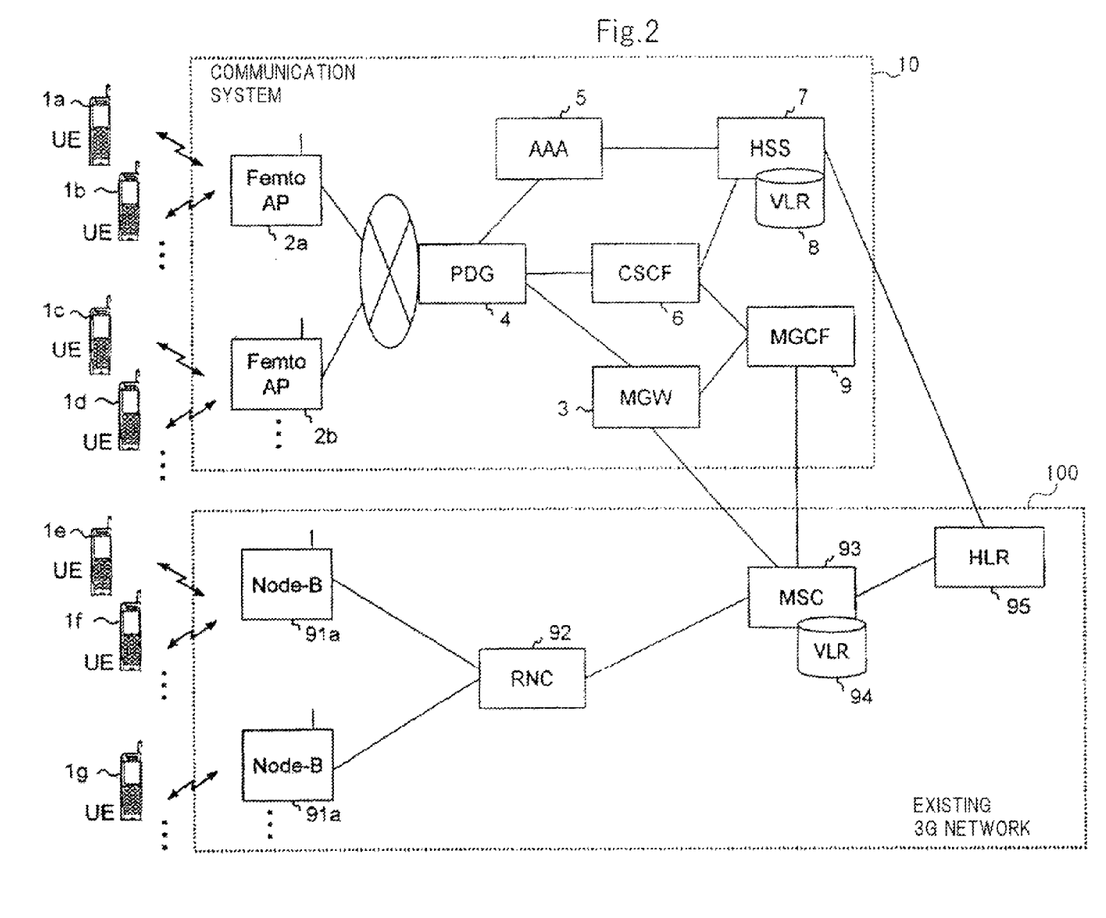
FIG. 2 is a block diagram showing a configuration example of a communication system of an exemplary embodiment.

As shown in FIG. 2, communication system 10 of the exemplary embodiment is configured to be able to connect to existing 3G network compliant with the standards defined by the 3GPP or the like (hereinafter referred to as "existing 3G network") 100.

Existing 3G network 100 includes HLR (Home Location Register) 95 which is used, for example, in an IMS (IP Multimedia subsystem) network, MSC (Mobile Switching Center) 93, Radio Network Controller (RNC) 92, and Node-B 91 which is a radio base station.

Communication system 10 of the exemplary embodiment includes Femto Access Point (Femto AP) 2 which constructs a predetermined communication area, Media Gateway (MGW) 3, PDG (Packet Data Gateway) 4 which is connected to each Femto AP 2 via a network, AAA (Authentication Authorisation Accounting) 5, Call Session Control Function (CSCF) 6, Home Subscriber Server (HSS) 7, and Media Gateway Control Function (MGCF) 9.

Femto AP 2 is a radio base station which includes a communication area (femto cell) with a radius in the order of several tens of meters, and can perform radio communication with UE 1 within the above described communication area. Femto AP 2 of the exemplary embodiment includes a storage device (sound source storage means) in which a sound source, used as a Ring Back Tone (SRBT) which has been previously determined by the system operator of a telecommunications carrier or the like, has been stored, and controls sending of the above described SRBT to the UE of a caller.

MGW 3 connects communication system 10 of the exemplary embodiment and another network such as existing 3G network 100 so that voice communication therebetween is enabled. Moreover, MGW 3 includes a storage device (sound source storage means) in which the sound source, used as the SRBT which has been previously determined by the system operator of the telecommunications carrier or the like, has been stored, and sends out the above described SRBT according to a request from MGCF 9.

PDG 4 is a device which relays various control messages for connecting an incoming call, which are transmitted and received between existing 3G network 100 and communication system 10.

AAA 5 executes an authentication process for authenticating each UE 1 accommodated in communication system 10 itself.

CSCF 6 performs control, management, authentication, routing and the like for each session for which an operation to connect an incoming call is performed, according to the well-known SIP (Session initiation Protocol).

HSS 7 includes VLR (Visitor Location Register) 8, and manages subscriber information on each user using UE 1. HSS 7 obtains the subscriber information on each user from HLR 95, stores the obtained subscriber information in VLR 8, and manages the obtained subscriber information.

MGCF 9 controls the call connection between communication system 10 of the exemplary embodiment and another network such as existing 3G network 100. Moreover, MGCF 9 controls sending of the SRBT from MGW 3.

Node-B 91, RNC 92, MSC 93, VLR 94 and HLR 95 included in the existing 3G network are devices which execute processes that comply with the standards defined by the 3GPP or the like, and are well known by a person ordinarily skilled in the art, and thus, here, descriptions of specific configurations, processes and the like are omitted.

UE 1 (1a to 1g in FIG. 2) is user equipment which is owned by the user and which can perform radio communication with Node-B 91 of existing 3G network 100 and Femto AP 2 of communication system 10 of the exemplary embodiment.

Note that although FIG. 2 shows a configuration example in which communication system 10 and existing 3G network 100 have been connected, the number of communication systems 10 or existing 3G networks 100 is not limited to one, and communication systems 10 and existing 3G networks 100 may be connected.

Next, operations of communication system 10 of the exemplary embodiment will be described by using FIGS. 3 to 6.

First, an operation in a case where UE 1 accommodated in arbitrary Femto AP 2 makes a call to UE 1 accommodated in another Femto AP 2 will be described by using FIG. 3. Note that calling UE 1 and called UE 1 may be accommodated in Femto AP 2 in the same communication system 10, or may be accommodated in Femto AP 2 in different communication systems 10.

When the call is made from calling UE 1, Femto AP (hereinafter referred to as "calling side Femto AP") 2 which accommodates above described calling UE 1 executes an MM Connection Procedure including an authentication process for above described calling UE 1, similarly to the existing 3G network (step S1).

When the connection between calling UE 1 and calling side Femto AP 2 is completed, calling UE 1 sends out a SETUP signal for requesting call setting, to calling side Femto AP 2 (step S2).

When calling side Femto AP 2 receives the SETUP signal from calling UE 1, calling side Femto AP 2 transmits an INVITE message which is an SIP message for requesting that a session be established, via CSCF 6 included in calling side communication system 10 and CSCF 6 included in called side communication system 10, to Femto AP (hereinafter referred to as "called side Femto AP") 2 which accommodates called UE 1 (step S3).

When called side Femto AP 2 receives the INVITE message, called side Femto AP 2 returns 100 Trying, which is a response message thereto, to calling side Femto AP 2 (step S4). When calling side Femto AP 2 receives 100 Trying, calling side Femto AP 2 transmits a CALLPROC signal, indicating acceptance of the call setting in response to the SETUP signal from calling UE 1, to calling UE 1 (step S5).

When called side Femto AP 2 returns 100 Trying to calling side Femto AP 2, called side Femto AP 2 executes the MM Connection Procedure similar to the existing 3G network, for called UE 1 existing in the communication area of the access point itself, including the authentication process therefor (step S6).

When the MM Connection Procedure with called UE 1 is completed, called side Femto AP 2 sends out the SETUP signal to called UE 1 (step S7). When called UE 1 receives the SETUP signal from called side Femto AP 2, called UE 1 returns a CALLCONF signal to above described called side Femto AP 2 (step S8).

When called side Femto AP 2 receives the CALLCONF signal from called UE 1, called side Femto AP 2 adds discrimination information, indicating that the access point itself is the Femto Access Point, to a predetermined area of 183 Session Progress, which is an SIP message, and transmits 183 Session Progress including the above described discrimination information to calling side Femto AP 2 (step S9). For example, if 183 Session Progress is described in the SDP (Session Description Protocol), this discrimination information can be realized by adding previously determined information such as a=femto.

When calling side Femto AP 2 receives 183 Session Progress including the discrimination information, calling side Femto AP 2 determines that called UE 1 is accommodated in the Femto Access Point (determination means), and also transmits a PRACK message, which is a response message, to called side Femto AP 2 (step S10).

Called side Femto AP 2 transmits 200 OK, which is an SIP message indicating that the request has been normally processed, to calling side Femto AP 2 (step S11).

When a process until step S11 is terminated, called side Femto AP 2 executes a Radio Bearer Setup Procedure similar to the existing 3G network, with respect to called UE 1 (step S12).

Next, when calling side Femto AP 2 reserves a resource to be used for a voice call, calling side Femto AP 2 transmits an UPDATE message, indicating completion of the reservation of the above described resource, to called side Femto AP 2 (step S13). When called side Femto AP 2 receives the UPDATE message, called side Femto AP 2 returns 200 OK to calling side Femto AP 2 (step S14).

When the Radio Bearer Setup Procedure is terminated, and called UE 1 transmits an ALERT signal for calling UE 1, to called side Femto AP 2 (step S15), called side Femto AP 2 transmits 180 Ringing (ringing notification) to calling side Femto AP 2 (step S16).

Calling side Femto AP 2 which has received 180 Ringing transmits an ALERT signal, indicating a start of calling a called user, to calling UE 1 (step S17).

Since calling side Femto AP 2 has determined in step S9 that called UE 1 is accommodated in the Femto Access Point, calling side Femto AP 2 transmits the ALERT signal in step S17, and subsequently uses the sound source included in the access point itself to transmit the SRBT to calling UE 1 (step S18).

Figure 4:
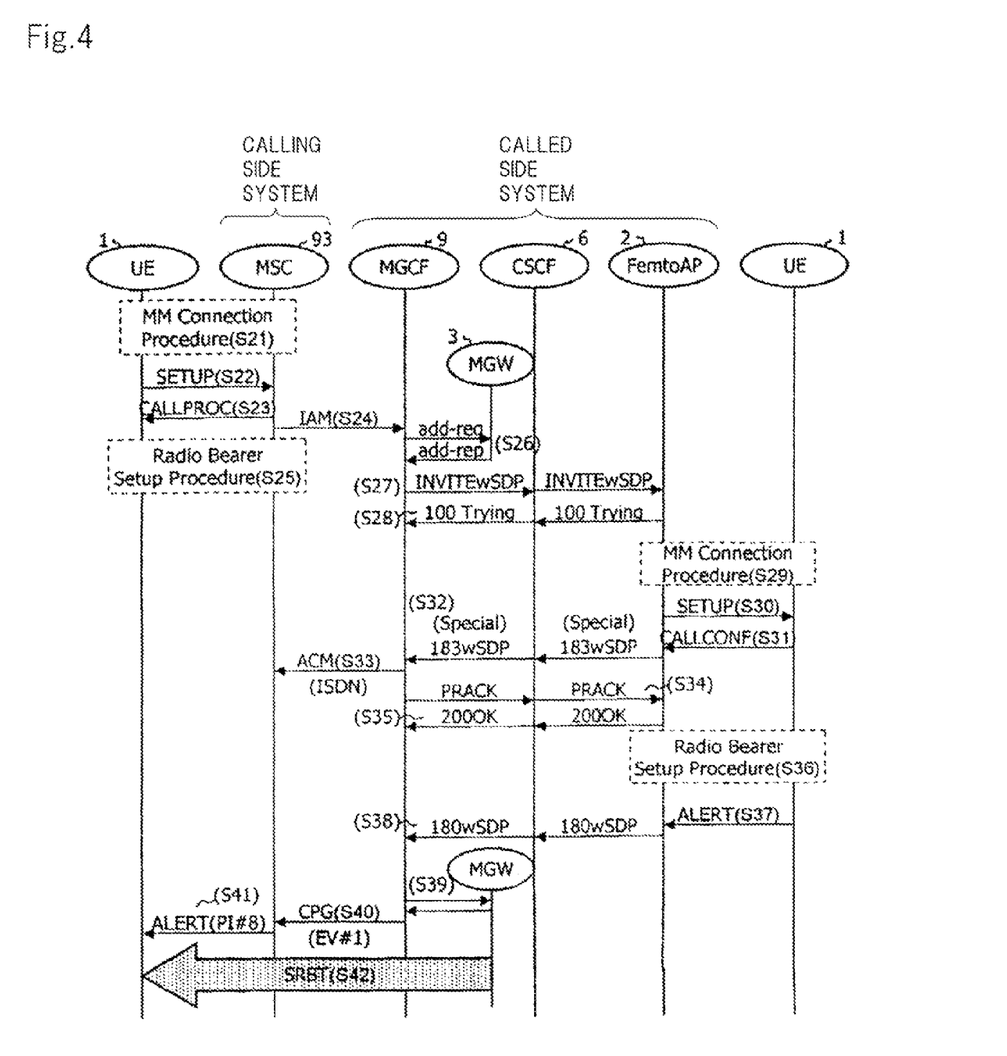
FIG. 4 is a sequence diagram showing an example of a processing procedure in a case where UE accommodated in the existing 3G network makes a call to UE accommodated in the communication system of the exemplary embodiment.

Next, an operation in a case where UE 1 accommodated in existing 3G network 100 makes a call to UE 1 accommodated in communication system 10 of the exemplary embodiment will be described by using FIG. 4.

When the call is made from calling UE 1, Node-B 91 which accommodates above described calling UE 1 executes the MM Connection Procedure including the authentication process for above described calling UE 1, similarly to the existing 3G network (step S21).

When the connection between calling UE 1 and Node-B 91 is completed, calling UE 1 sends out the SETUP signal for requesting the call setting, via Node-B 91 to MSC 93 included in the calling side system (step S22).

When MSC 93 receives the SETUP signal from calling UE 1, MSC 93 returns the CALLPROC signal in response thereto, to calling UE 1 (step S23), and transmits an IAM message to MGCF 9 of the called side system (step S24). Moreover, MSC 93 executes the Radio Bearer Setup Procedure of the existing 3G network, such as setting of a band used for the radio communication with calling UE 1 (step S25).

MGCF 9 can judge that the radio base station which accommodates calling UE 1 is not the Femto Access Point, by receiving the IAM message from MSC 93 in the above described step S24 (the determination means). In this case, MGCF 9 requests MGW 3 of the called side system to start control of voice communication (step S26), and transmits the INVITE message to called side Femto AP 2 of called side communication system 10 (step S27).

When called side Femto AP 2 receives the INVITE message, called side Femto AP 2 returns 100 Trying, which is the response message thereto, to MGCF 9 of the called side system (step S28). Moreover, when called side Femto AP 2 receives the INVITE message, called side Femto AP 2 executes the MM Connection Procedure similarly to the existing 3G network, for called UE 1, including the authentication process therefor (step S29).

When the MM Connection Procedure with called UE 1 is completed, called side Femto AP 2 sends out the SETUP signal for requesting the call setting, to called UE 1 (step S30). When called UE 1 receives the SETUP signal from called side Femto AP 2, called UE 1 returns the CALLCONF signal to above described called side Femto AP 2 (step S31).

Figure 3:
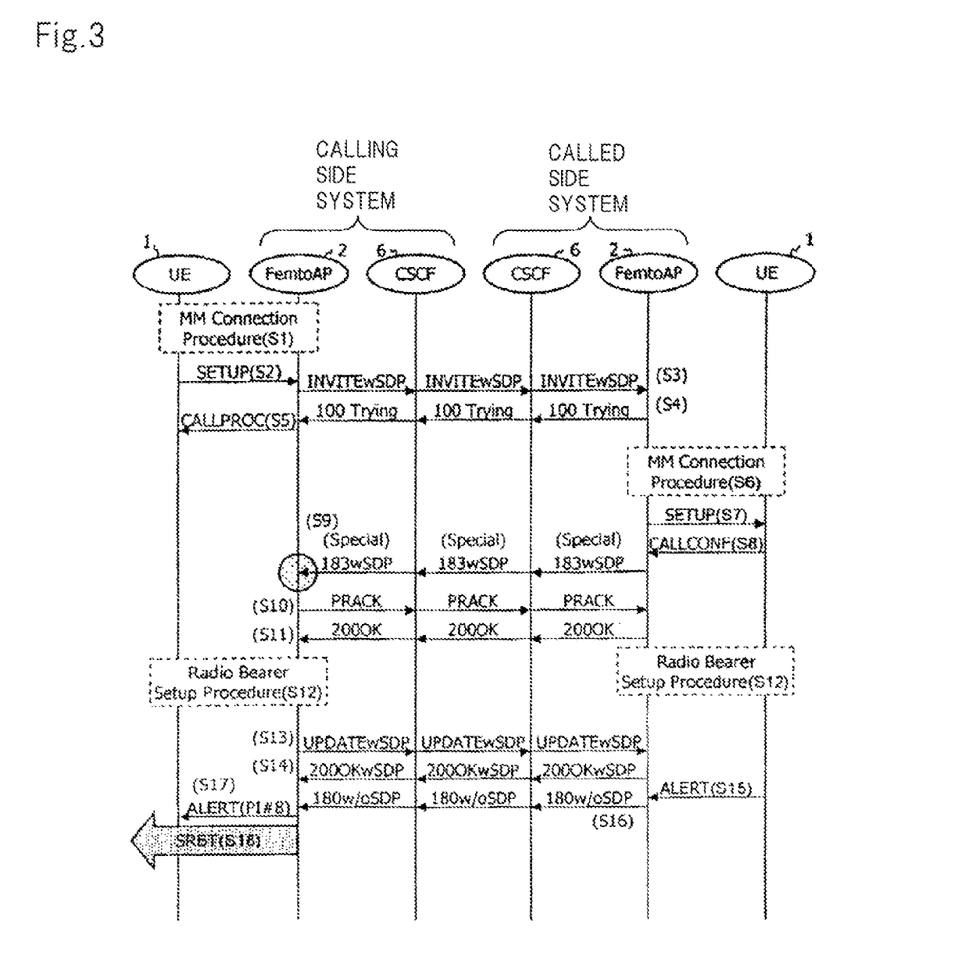
FIG. 3 is a sequence diagram showing an example of a processing procedure in a case where UE accommodated in an arbitrary Femto AP makes a call to UE accommodated in another Femto AP.

When called side Femto AP 2 receives the CALLCONF signal from called UE 1, called side Femto AP 2 adds the discrimination information, indicating that the access point itself is the Femto Access Point, to the predetermined area of 183 Session Progress, and transmits 183 Session Progress including the discrimination information to MGCF 9 of the called side system, similarly to the processing procedure shown in FIG. 3 (step S32).

When MGCF 9 receives 183 Session Progress from called side Femto AP 2, MGCF 9 transmits an address complete message (ACM) of the existing 3G network to MSC 93 of the calling side system, without checking whether or not the discrimination information has been added (step S33), and transmits the PRACK message in response to 183 Session Progress, to called side Femto AP 2 (step S34). When called side Femto AP 2 receives the PRACK message, called side Femto AP 2 transmits 200 OK to MGCF 9 (step S35).

When a process until step S35 is terminated, called side Femto AP 2 executes the Radio Bearer Setup Procedure similar to the existing 3G network, with respect to called UE 1, similarly to the processing procedure shown in FIG. 3 (step S36).

When the Radio Bearer Setup Procedure is terminated, and called UE 1 transmits the ALERT signal for calling UE 1, to called side Femto AP 2 (step S37), called side Femto AP 2 transmits 180 Ringing (ringing notification) to MGCF 9 of the called side system (step S38).

Since MGCF 9 which has received 180 Ringing has determined in step S24 that calling UE 1 is not accommodated in the Femto Access Point, MGCF 9 requests MGW 3 to transmit the SRBT (step S39), and transmits a call progress (CPG) message of the existing 3G network to MSC 93 of the calling side system (step S40).

MSC 93 which has received the call progress (CPG) message transmits the ALERT signal to calling UE 1 via Node-B 91 (step S41).

According to the request from MGCF 9, MGW 3 uses the sound source included in the device itself to transmit the SRBT to calling UE 1 via MSC 93 and Node-B 91 (step S42).

Next, an operation in a case where UE 1 accommodated in communication system 10 of the exemplary embodiment makes a call to UE 1 accommodated in existing 3G network 100 will be described by using FIG. 5.

When the call is made from calling UE 1, Femto AP (calling side Femto AP) 2 which accommodates above described calling UE 1 executes the MM Connection Procedure including the authentication process for above described calling UE 1, similarly to the existing 3G network (step S51).

When the connection between calling UE 1 and calling side Femto AP 2 is completed, calling UE 1 sends out the SETUP signal for requesting the call setting, to calling side Femto AP 2 (step S52).

When calling side Femto AP 2 receives the SETUP signal from calling UE 1, calling side Femto AP 2 transmits the INVITE message to MGCF 9 (step S53).

When MGCF 9 receives the INVITE message, MGCF 9 returns 100 Trying, which is the response message thereto, to calling side Femto AP 2 (step S54).

When calling side Femto AP 2 receives the 100 Trying, calling side Femto AP 2 returns the CALLPROC signal in response to the SETUP signal, to calling UE 1 (step S55).

When MGCF 9 transmits the above described 100 Trying, subsequently, MGCF 9 transmits 183 Session Progress to calling side Femto AP 2 (step S56).

Here, 183 Session Progress transmitted from MGCF 9 is the SIP message which does not include the above described discrimination information and which is used in the existing 3G network. Therefore, calling side Femto AP 2 which has received 183 Session Progress determines that called UE 1 is not accommodated in the Femto Access Point (the determination means), and transmits the PRACK message to MGCF 9 (step S57). When MGCF 9 receives the PRACK message, MGCF 9 transmits 200 OK to calling side Femto AP 2 (step S58).

When a process until step S58 is terminated, calling side Femto AP 2 executes the Radio Bearer Setup Procedure similar to the existing 3G network, with respect to calling UE 1, similarly to the processing procedure shown in FIG. 3 (step S59).

Next, when calling side Femto AP 2 reserves the resource to be used for the voice call, calling side Femto AP 2 transmits the UPDATE message, indicating completion of the reservation of the above described resource, to MGCF 9 (step S60), and sends out a PROG message to calling UE 1, similarly to the existing 3G network (step S61).

When MGCF 9 receives the UPDATE message, MGCF 9 returns 200 OK to calling side Femto AP 2 (step S62), and transmits the IAM message of the existing 3G network to MSC 93 of the called side system (step S63).

When MSC 93 receives the IAM message, MSC 93 executes the MM Connection Procedure, similarly to the existing 3G network, for called UE 1 accommodated in Node-B 91, including the authentication process therefor (step S64).

When the connection between called UE 1 and Node-B 91 is completed, MSC 93 sends out the SETUP signal for requesting the call setting, to called UE 1 via Node-B 91 (step S65).

When called UE 1 receives the SETUP signal from MSC 93, called UE 1 returns the CALLCONF signal in response thereto, to MSC 93 (step S66).

When MSC 93 receives the CALLPROC signal from called UE 1, MSC 93 transmits the address complete message (ACM) of the existing 3G network to MGCF 9 (step S67), and executes the Radio Bearer Setup Procedure similar to the existing 3G network, with respect to called UE 1, similarly to the processing procedure shown in FIG. 3 (step S68).

When MGCF 9 receives the address complete message from MSC 93, MGCF 9 transmits 183 Session Progress to calling side Femto AP 2 (step S69), and calling side Femto AP 2 transmits the PRACK message in response thereto, to MGCF 9 (step S70). When MGCF 9 receives the PRACK message, MGCF 9 transmits 200 OK to calling side Femto AP 2 (step S71).

When called UE 1 terminates the Radio Bearer Setup Procedure and transmits the ALERT signal for calling UE 1, to MSC 93 (step S72), MSC 93 transmits the call progress (CPG) message of the existing 3G network to MGCF 9 (step S73).

MGCF 9 which has received the call progress (CPG) message transmits 180 Ringing (ringing notification) to calling side Femto AP 2 (step S74).

Calling side Femto AP 2 which has received 180 Ringing transmits the ALERT signal to calling UE 1 (step S75), and transmits the PRACK message in response to 180 Ringing, to MGCF 9 (step S76). Moreover, since calling side Femto AP 2 has determined in step S57 that called UE 1 is not accommodated in the Femto Access Point, calling side Femto AP 2 opens a voice line with respect to MSC 93 so that communication therebetween is enabled.

When MGCF 9 receives the PRACK message from calling side Femto AP 2, MGCF 9 transmits 200 OK to calling side Femto AP 2 (step S77).

MSC 93 uses the sound source included in the device itself to transmit the SRBT to calling side Femto AP 2 (step S78). At this time, since the voice line between calling side Femto AP 2 and MSC 93 has been already opened, the SRBT transmitted from MSC 93 is received by calling UE 1.

Figure 6:
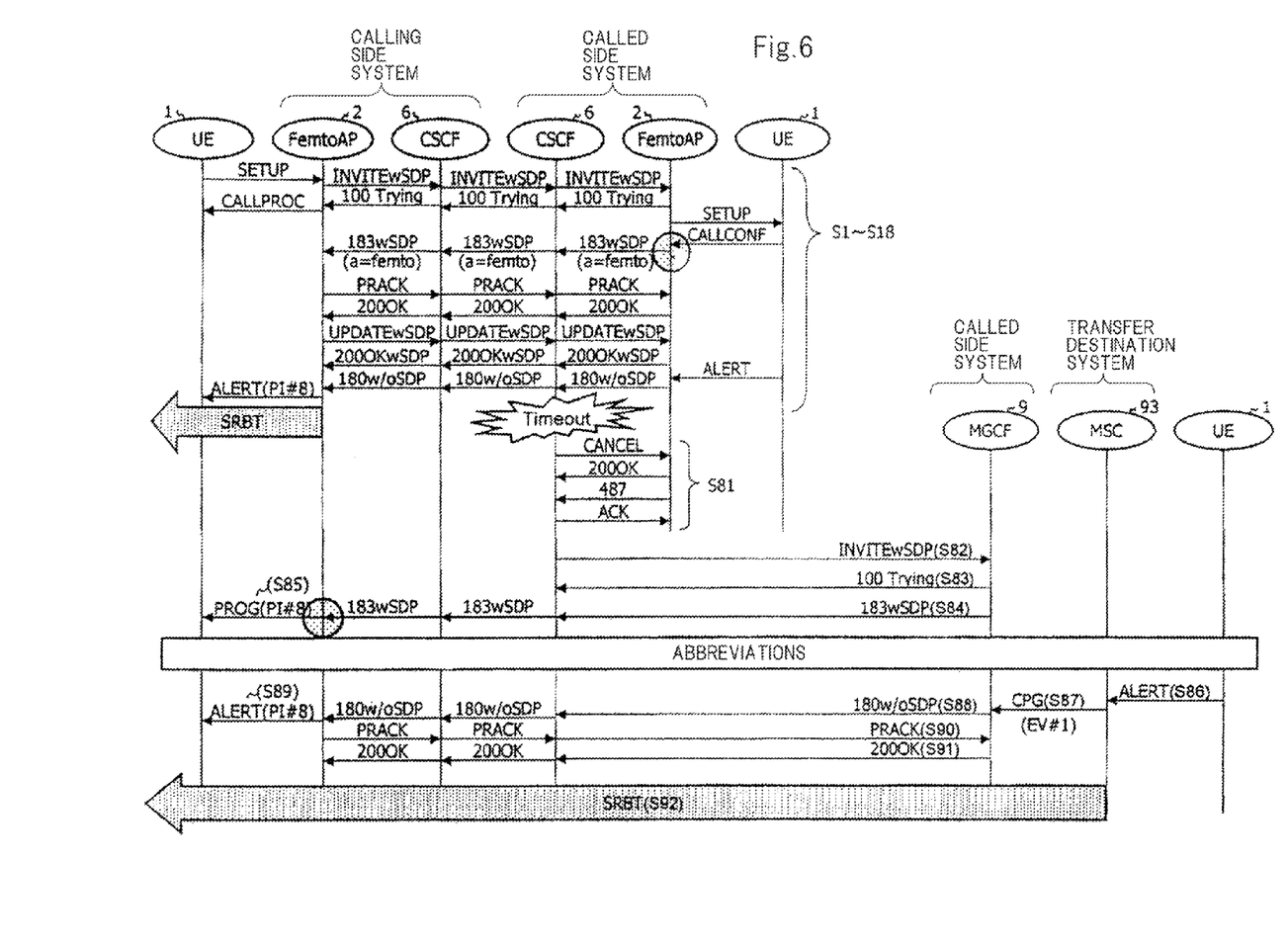
FIG. 6 is a sequence diagram showing an example of a processing procedure in a case where a call is transferred.

Next, an operation in a case, where UE (calling UE) 1 accommodated in communication system 10 of the exemplary embodiment makes a call to UE (called UE) 1 accommodated in another communication system 10, above described called UE 1 does not respond, and thus the call is transferred to another UE 1 which has been previously determined, will be described by using FIG. 6.

Here, the process after a state where the process in step S1 to step S18 shown in FIG. 3 has been executed, and the SRBT that has been outputted from calling side Femto AP 2 to calling UE 1 will be described.

If the SRBT has been outputted from calling side Femto AP 2 to calling UE 1, and called UE 1 does not respond even when a previously determined time has elapsed, CSCF 6 of the called side system determines that the user is absent, and transmits a CANCEL signal for notifying cancellation of the call, to called side Femto AP 2. When called side Femto AP 2 receives the CANCEL signal, called side Femto AP 2 transmits 200 OK and 487 Request Terminated indicating termination of the request, to CSCF 6. When CSCF 6 receives 200 OK and 487 Request Terminated from called side Femto AP 2, CSCF 6 returns an ACK signal which is a response signal thereto (step S81).

Figure 5:
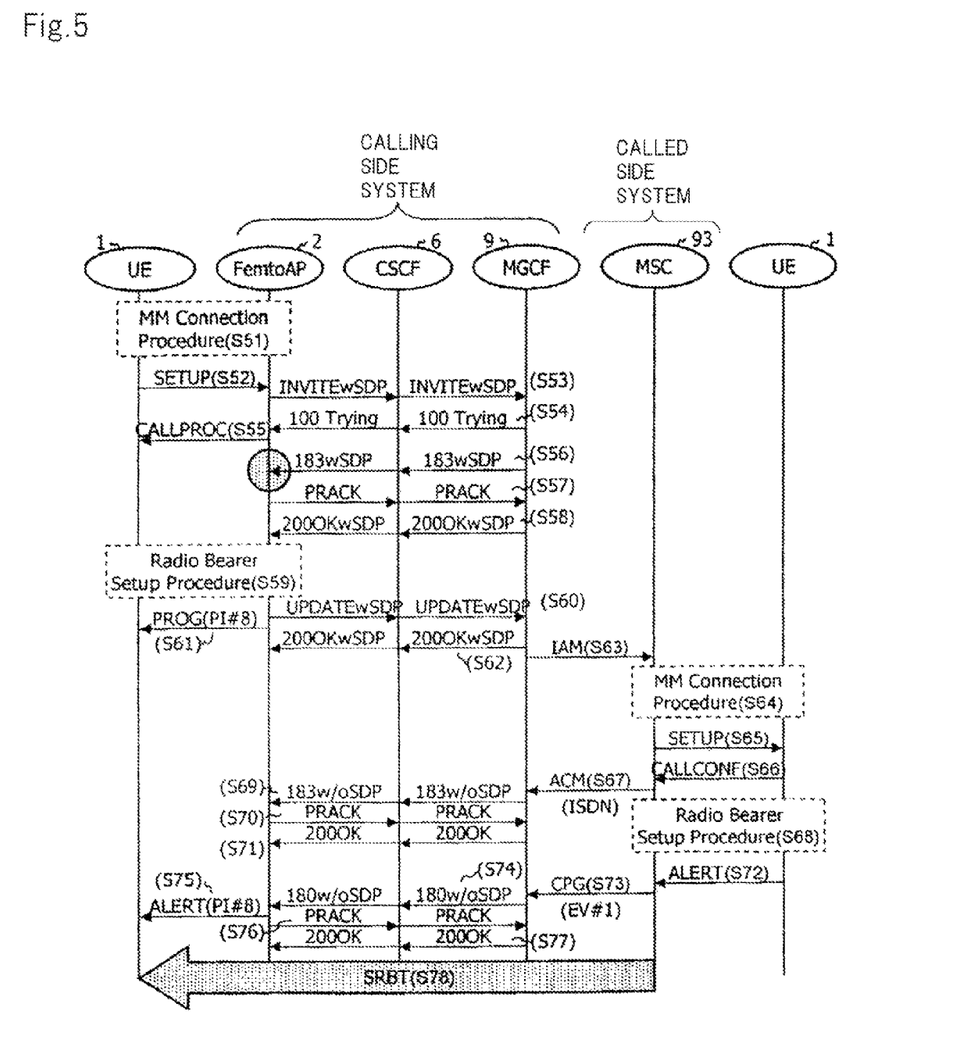
FIG. 5 is a sequence diagram showing an example of a processing procedure in a case where the UE accommodated in the communication system of the exemplary embodiment makes a call to the UE accommodated in the existing 3G network.

When the call is cancelled, CSCF 6 of the called side system transmits the INVITE message to MGCF 9 similarly to the processing procedure shown in FIG. 5, in order to make the call again to the transfer destination which has been previously set (step S82).

Similarly to the processing procedure shown in FIG. 5, MGCF 9 returns a 100 Trying message to CSCF 6 (step S83), and transmits 183 Session Progress to calling side Femto AP 2 (step S84).

Here, since 183 Session Progress received by calling side Femto AP 2 does not include the above described discrimination information, calling side Femto AP 2 which has received 183 Session Progress determines that called UE 1 which becomes the transfer destination is not accommodated in the Femto Access Point (the determination means), and sends out the PROG message of the existing 3G network to calling UE 1, similarly to the processing procedure shown in FIG. 5 (step S85).

Furthermore, when the processing procedure similar to the above described FIG. 5 is executed, and UE (transfer destination UE) 1 which becomes the transfer destination transmits the ALERT signal to MSC 93 (step S86), MSC 93 transmits the call progress message (CPG) of the existing 3G network to MGCF 9 (step S87).

The MGCF which has received the call progress (CPG) message transmits 180 Ringing (ringing notification) to calling side Femto AP 2 (step S88).

Calling side Femto AP 2 which has received 180 Ringing transmits the ALERT signal to calling UE 1 (step S89), and transmits the PRACK message in response to 180 Ringing, to MGCF 9 (step S90). Moreover, since calling side Femto AP 2 has determined in step S84 that transfer destination UE 1 is not accommodated in the Femto Access Point, calling side Femto AP 2 opens the voice line with respect to MSC 93 so that communication therebetween is enabled.

When MGCF 9 receives the PRACK message from calling side Femto AP 2, MGCF 9 transmits 200 OK to calling side Femto AP 2 (step S91).

MSC 93 uses the sound source retained in the device itself to transmit the SRBT to calling side Femto AP 2 (step S92). At this time, since the voice line between calling side Femto AP 2 and MSC 93 has already been opened, the SRBT transmitted from MSC 93 is received by calling UE 1.

Note that although the above description has shown an example in which the call is made from UE 1 accommodated in Femto AP 2, and UE 1 which becomes the transfer destination is accommodated in existing 3G network 100, for example, if the call is made from UE 1 accommodated in Femto AP 2, and if UE 1 which becomes the transfer destination is accommodated in Femto AP 2, the call may be incoming in UE1, which is the transfer destination of call, according to the processing procedure similar to FIG. 3, and the SRBT may be transmitted from calling side Femto AP 2 to calling UE 1. Moreover, if the call is made from UE 1 accommodated in existing 3G network 100, and if UE 1 which becomes the transfer destination is accommodated in Femto AP 2, the call may be incoming in UE1, which is the transfer destination of call, according to the processing procedure similar to FIG. 4, and the SRBT may be transmitted from MGW 3 to calling UE 1.

According to the communication system of the exemplary embodiment, in calling side Femto AP 2, it is determined whether or not called UE 1 is accommodated in Femto AP 2, depending on whether or not the discrimination information has been added to 183 Session Progress which is the SIP message, and if called UE 1 is accommodated in Femto AP 2, the SRBT is transmitted to calling UE 1. Therefore, the communication system including the Femto Access Point can be realized in which the sending of the SRBT can be controlled similarly to the existing 3G network.

Moreover, also if UE 1 accommodated in existing 3G network 100 has made the call to UE 1 accommodated in Femto AP 2, the communication system including the Femto Access Point can be realized in which the sending of the SRBT can be controlled similarly to the existing 3G network, by transmitting the SRBT from MGW 3 to calling UE 1.

Furthermore, also if the call is transferred, similarly to the above description, the communication system including the Femto Access Point can be realized in which the sending of the SRBT can be controlled similarly to the existing 3G network, by transmitting the SRBT from calling side Femto AP 2 or MGW 3 to calling UE 1, depending on whether or not the UE, which is the transfer destination of call, is accommodated in Femto AP 2.

Moreover, communication system 10 of the exemplary embodiment can be introduced without changing existing 3G network 100.

Note that the present invention is not limited to the description of the exemplary embodiment as described above, and various variations can be made within the scope of the technical idea of the present invention.

For example, although the exemplary embodiment shows an example in which communication system 10 includes devices, functions of these devices may be realized by a device or may be realized by the devices.

Moreover, MGW 3, PDG 4, AAA 5, CSCF 6, HSS 7 and MGCF 9 included in communication system 10 of the exemplary embodiment can also be realized by a computer including a communication function, and Femto Access Point 2 can also be realized by a computer including a radio communication function. In that case, functions of these devices can be realized by executing a predetermined process by a CPU included in the above described computer, according to a program stored in a recording medium.

The recording medium may be anything which can be read by the computer, for example, such as a flexible disk, a hard disk, an optical disk, a magnetic optical disk, a CD-ROM, a CD-R, a CD-RW, a DVD-ROM, a DVD-RAM, a DVD-RW, a DVD+RW, a magnetic tape, a nonvolatile memory card, or a ROM.

Hereinabove, although the invention of the present application has been described with reference to the exemplary embodiment, the invention of the present application is not limited to the exemplary embodiment as described above. Various changes which can be understood by a person ordinarily skilled in the art can be made to a configuration or details of the invention of the present application within the scope of the invention of the present application.

The invention claimed is:

1. A communication system comprising a Femto Access Point which can accommodate user equipment by means of radio communication, wherein
said Femto Access Point includes:
determination means for determining whether or not called side user equipment is accommodated in the Femto Access Point;
communication control means for, if said determination means has determined that said called side user equipment is accommodated in the Femto Access Point, sending out a Ring Back Tone to calling side user equipment; and
discrimination information sending means for, when an incoming call to the called side user equipment accommodated in the Femto Access Point itself occurs, including discrimination information indicating that the called side user equipment is accommodated in the Femto Access Point, in a predetermined SIP message, and sending out the predetermined SIP message including the discrimination information.

2. The communication system according to claim 1, wherein
when said predetermined SIP message including said discrimination information is received, said determination means determines that the called side user equipment is accommodated in the Femto Access Point, and
when said predetermined SIP message not including said discrimination information is received, said determination means determines that the called side user equipment is not accommodated in the Femto Access Point.

3. The communication system according to claim 1, wherein
said Femto Access Point comprises:
sound source storage means in which a sound source, used as the Ring Back Tone which has been previously determined, has been stored, and
if the access point itself accommodates the calling side user equipment, and if said determination means has determined that the called side user equipment is accommodated in the Femto Access Point,
when a ringing notification is received, said communication control means uses the sound source stored in said sound source storage means to send out said Ring Back Tone to said calling side user equipment.

4. The communication system according to claim 1, wherein
if the access point itself accommodates the calling side user equipment, and if said determination means has determined that the called side user equipment is not accommodated in the Femto Access Point,
said communication control means opens a voice line between the calling side user equipment and a switching center which accommodates said called side user equipment so that communication therebetween is enabled.

5. The communication system according to claim 1, wherein
if a call made by said calling side user equipment is transferred to different user equipment other than said called side user equipment,
said determination means determines whether or not the user equipment which becomes a transfer destination is accommodated in the Femto Access Point, and
if said determination means has determined that the user equipment, which is the transfer destination of call, is accommodated in the Femto Access Point, said communication control means sends out the Ring Back Tone to the calling side user equipment.

6. The communication system according to claim 1, wherein
said communication system comprises:
a Media Gateway; and
a Media Gateway Control Function,
said Media Gateway comprises:
sound source storage means in which a sound source, used as the Ring Back Tone, which has been previously determined, has been stored; and
sending means for, when a sending request is received from said Media Gateway Control Function, using the sound source stored in said sound source storage means to send out said Ring Back Tone to the calling side user equipment, and
said Media Gateway Control Function includes:
determination means for determining whether or not the calling side user equipment is accommodated in the Femto Access Point; and
sending control means for, if the calling side user equipment is not accommodated in the Femto Access Point, when the ringing notification is received, requesting said Media Gateway to use said sound source to send out the Ring Back Tone.

7. A Femto Access Point which can accommodate user equipment by means of radio communication, including:
determination means for determining whether or not called side user equipment is accommodated in the Femto Access Point;
communication control means for, if said determination means has determined that said called side user equipment is accommodated in the Femto Access Point, sending out a Ring Back Tone to calling side user equipment; and
discrimination information sending means for, when an incoming call to the called side user equipment accommodated in the Femto Access Point itself occurs, including discrimination information indicating that the called side user equipment is accommodated in the Femto Access Point, in a predetermined SIP message, and sending out the predetermined SIP message including the discrimination information.

8. The Femto Access Point according to claim 7, wherein
when said predetermined SIP message including said discrimination information is received, said determination means determines that the called side user equipment is accommodated in the Femto Access Point, and
when said predetermined SIP message not including said discrimination information is received, said determination means determines that the called side user equipment is not accommodated in the Femto Access Point.

9. The Femto Access Point according to claim 7, comprising:
sound source storage means in which a sound source, used as the Ring Back Tone, which has been previously determined, has been stored, wherein if the access point itself accommodates the calling side user equipment, and if said determination means has determined that the called side user equipment is accommodated in the Femto Access Point,
when a ringing notification is received, said communication control means uses the sound source stored in said sound source storage means to send out said Ring Back Tone to said calling side user equipment.

10. The Femto Access Point according to claim 7, wherein if the access point itself accommodates the calling side user equipment, and if said determination means has determined that the called side user equipment is not accommodated in the Femto Access Point,
said communication control means opens a voice line between the calling side user equipment and a switching center which accommodates said called side user equipment so that communication therebetween is enabled.

11. The Femto Access Point according to claim 7, wherein if a call made by said calling side user equipment is transferred to different user equipment other than said called side user equipment,
said determination means determines whether or not the user equipment which becomes a transfer destination is accommodated in the Femto Access Point, and
if said determination means has determined that the user equipment, which is the transfer destination of call, is accommodated in the Femto Access Point, said communication control means sends out the Ring Back Tone to the calling side user equipment.

12. A communication method in a communication system comprising a Femto Access Point which can accommodate user equipment by means of radio communication, wherein
said Femto Access Point determines whether or not called side user equipment is accommodated in the Femto Access Point, and
if said Femto Access Point has determined that said called side user equipment is accommodated in the Femto Access Point, said Femto Access Point sends out a Ring Back Tone to calling side user equipment, wherein
when an incoming call to the called side user equipment accommodated in the Femto Access Point itself occurs, said Femto Access Point includes discrimination information indicating that the called side user equipment is accommodated in the Femto Access Point, in a predetermined SIP message and sends out the predetermined SIP message including the discrimination information.

13. The communication method according to claim 12, wherein
when said predetermined SIP message including said discrimination information is received, said Femto Access Point determines that the called side user equipment is accommodated in the Femto Access Point, and
when said predetermined SIP message not including said discrimination information is received, said Femto Access Point determines that the called side user equipment is not accommodated in the Femto Access Point.

14. The communication method according to claim 12, wherein
said Femto Access Point comprises:
a sound source used as the Ring Back Tone which has been previously determined, and
if the access point itself accommodates the calling side user equipment, and if it has been determined that the called side user equipment is accommodated in the Femto Access Point,
when a ringing notification is received, said Femto Access Point uses said sound source to send out said Ring Back Tone to said calling side user equipment.

15. The communication method according to claim 12, wherein
if the access point itself accommodates the calling side user equipment, and if it has been determined that the called side user equipment is not accommodated in the Femto Access Point,
said Femto Access Point opens a voice line between the calling side user equipment and a switching center which accommodates said called side user equipment so that communication therebetween is enabled.

16. The communication method according to claim 12, wherein
if a call made by said calling side user equipment is transferred to different user equipment other than said called side user equipment,
it is determined whether or not the user equipment which becomes a transfer destination is accommodated in the Femto Access Point, and
if it has been determined that the user equipment, which is the transfer destination of call, is accommodated in the Femto Access Point, the Ring Back Tone is sent out to the calling side user equipment.

17. The communication method according to claim 12, wherein
said communication system comprises a Media Gateway and a Media Gateway Control Function,
said Media Gateway comprises:
a sound source used as the Ring Back Tone which has been previously determined, and
when a sending request is received from said Media Gateway Control Function, said Media Gateway uses said sound source to send out said Ring Back Tone to the calling side user equipment,
said Media Gateway Control Function determines whether or not the calling side user equipment is accommodated in the Femto Access Point, and
if the calling side user equipment is not accommodated in the Femto Access Point, when the ringing notification is received, said Media Gateway Control Function requests said Media Gateway to use said sound source to send out the Ring Back Tone.

* * * * *